United States Patent
Dauner et al.

(10) Patent No.: US 12,522,305 B2
(45) Date of Patent: Jan. 13, 2026

(54) AIR-GUIDING ELEMENT AND VEHICLE HAVING AT LEAST ONE AIR-GUIDING ELEMENT

(71) Applicant: Bayerische Motoren Werke Aktiengesellschaft, Munich (DE)

(72) Inventors: Willy Dauner, Gersthofen (DE); Falco Hollmann, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 435 days.

(21) Appl. No.: 18/030,187

(22) PCT Filed: Nov. 17, 2021

(86) PCT No.: PCT/EP2021/082003
§ 371 (c)(1),
(2) Date: Apr. 4, 2023

(87) PCT Pub. No.: WO2022/106477
PCT Pub. Date: May 27, 2022

(65) Prior Publication Data
US 2023/0331317 A1    Oct. 19, 2023

(30) Foreign Application Priority Data
Nov. 18, 2020  (DE) ................. 10 2020 130 431.5

(51) Int. Cl.
*B62D 35/00*    (2006.01)
*B32B 5/02*    (2006.01)

(52) U.S. Cl.
CPC ............ *B62D 35/005* (2013.01); *B32B 5/024* (2013.01); *B32B 2605/08* (2013.01)

(58) Field of Classification Search
CPC .... B62D 35/005; B32B 5/024; B32B 2605/08
See application file for complete search history.

(56) References Cited

U.S. PATENT DOCUMENTS

| 4,826,226 A | * | 5/1989 | Klie ........................ B60R 19/22 |
| | | | 293/120 |
| 6,513,843 B1 | | 2/2003 | Frederick et al. |

(Continued)

FOREIGN PATENT DOCUMENTS

| DE | 3325104 A1 | * | 1/1985 | |
| DE | 10325652 A1 | * | 12/2004 | ........... B29C 70/865 |

(Continued)

OTHER PUBLICATIONS

International Search Report (PCT/ISA/210) issued in PCT Application No. PCT/EP2021/082003 dated Feb. 16, 2022 with English translation (six (6) pages).

(Continued)

*Primary Examiner* — Faye M Fleming
(74) *Attorney, Agent, or Firm* — Crowell & Moring LLP

(57) ABSTRACT

An air-guiding element on or in a vehicle is formed of at least one fiber-reinforced composite material having a multi-layered sandwich structure. At least one of the layers of the sandwich structure is a resilient layer that consists of or comprises a material comprising an elastomer, and the layers of the sandwich structure are interconnected by a plastic matrix material.

14 Claims, 4 Drawing Sheets

(56) References Cited

U.S. PATENT DOCUMENTS

| | | |
|---|---|---|
| 2005/0194815 A1 | 9/2005 | Mc Knight et al. |
| 2012/0034833 A1 | 2/2012 | Schaube et al. |
| 2019/0264482 A1 | 8/2019 | Malia et al. |
| 2022/0132679 A1* | 4/2022 | Han .................. E05D 1/00 |

FOREIGN PATENT DOCUMENTS

| | | |
|---|---|---|
| DE | 20 2009 006 966 U1 | 10/2010 |
| DE | 10 2019 007 206 A1 | 4/2020 |
| EP | 1 935 764 A2 | 6/2008 |
| WO | WO 2010/118860 A2 | 10/2010 |

OTHER PUBLICATIONS

German-language Written Opinion (PCT/ISA/237) issued in PCT Application No. PCT/EP2021/082003 dated Feb. 16, 2022 (five (5) pages).

German-language Search Report issued in German Application No. 10 2020 130 431.5 dated Jul. 30, 2021 with partial English translation (11 pages).

Cover Page of EP 2 419 272 A2 published Feb. 22, 2012 (one (1) page).

* cited by examiner

AIR-GUIDING ELEMENT AND VEHICLE HAVING AT LEAST ONE AIR-GUIDING ELEMENT

TECHNICAL FIELD

The invention relates to an air-guiding element on or in a vehicle. It also relates to a vehicle, in particular a motor vehicle, having at least one such air-guiding element.

BACKGROUND AND SUMMARY

Air-guiding elements are active aerodynamic means which are conventional in vehicle construction and which use the relative wind flowing against the moving vehicle so as to deflect this wind aerodynamically and thereby influence the aerodynamic properties and the driving behavior of the vehicle.

Such air-guiding elements can be mounted either rigidly on the vehicle, for example as a front spoiler or as a rear spoiler, or adjustably. Adjustable air-guiding elements generally have at least one actuator by means of which the air-guiding element or a part thereof is adjustable from a standard position for relatively low driving speeds into a high-speed position for relatively high driving speeds. Fixed air-guiding elements, which are intended to be aerodynamically effective at relatively high speeds, have the disadvantage that, at a low speed, when there is no or only slight aerodynamic effectiveness, they nevertheless have an increased flow resistance and thus increase the fuel consumption. Particularly in the front spoiler region there is also an undesired reduction in the overhang angle of the front vehicle overhang. By contrast, actively driven air-guiding elements require an actuator and complex mechanical or pneumatic actuating means and are therefore complicated and expensive.

The object of the present invention is to provide an improved air-guiding element of the type in question that has only a small influence on the fuel consumption at low speeds and is nevertheless aerodynamically effective at higher speeds.

This object is achieved by the features of the independent claims.

An air-guiding element on or in a vehicle, wherein the air-guiding element is formed from at least one fiber composite material having a multi-layered sandwich structure, is distinguished according to the invention by the fact that at least one of the layers of the sandwich structure is an elastic layer which consists of or comprises a material comprising an elastomer, and by the fact that the layers of the sandwich structure are connected to one another by a plastic matrix material.

Although this air-guiding device built up in a sandwich construction with at least one elastic layer is or can be rigidly connected to the vehicle, it is able to bend to a slight degree as a result of the elastic layer. If the relative wind then impinges the air-guiding device, which is provided on the vehicle so as to be at least slightly inclined with respect to the relative wind in its starting position, the flow force of the relative wind on the surface of the air-guiding device exerts a normal force which generates a bending moment which bends the air-guiding device about its root portion, by which it is fastened to the vehicle, specifically to a greater degree the higher the incident-flow velocity. The increase in the incident-flow velocity not only increases the magnitude of the forces acting on the air-guiding device, but the increasing deflection of the air-guiding device also increases the fraction of the incident-flow forces acting on the air-guiding device in the normal direction. When the drive speed decreases again, the flow velocity of the relative wind also decreases and the incident-flow forces acting on the air-guiding device in the normal direction become smaller. The stiff layers of the sandwich structure, which are initially deflected together with the elastic layer, ensure by way of their restoring forces that the air-guiding device moves back into its starting position again with a lower driving speed.

Further preferred and advantageous design features of the air-guiding device according to the invention form the subject matter of the dependent claims.

It is advantageous if the sandwich structure has at least one upper nonelastic layer and at least one lower nonelastic layer, which each consist of or comprise a laid fiber scrim, a knitted fiber fabric or a woven fiber fabric, and if the elastic layer is arranged between the at least one upper nonelastic layer and the at least one lower nonelastic layer.

Alternatively, the sandwich structure can preferably have at least one upper nonelastic layer and at least one lower nonelastic layer and also at least one further nonelastic layer situated between them, which each consist of a laid fiber scrim, a knitted fiber fabric or a woven fiber fabric, and in each case an elastic layer can be arranged between the nonelastic layers. The sandwich structure can have a single upper nonelastic layer. Additionally or alternatively, the sandwich structure can have a single lower nonelastic layer. The sandwich structure can have a single upper nonelastic layer and two or more lower nonelastic layers. Additionally or alternatively, the sandwich structure can have a single lower nonelastic layer and two or more upper nonelastic layers.

Of particular advantage is an embodiment of the invention, which can be combined with other embodiments, in which at least one of the layers of the air-guiding element has a self-supporting region and a root region at which the air-guiding element is or can be connected to a body or to another structural part of the vehicle, and wherein at least one nonelastic layer has, between the root region and the self-supporting region, at least one locally stiffness-reduced bending region which defines a preferred bending axis.

Here, the locally stiffness-reduced bending region preferably has a cutout, wherein the at least one cutout defines the preferred bending axis.

Here, the at least one cutout preferably takes the form of an oblong hole or slot whose longitudinal direction extends parallel to the preferred bending axis.

It is also particularly advantageous if at least one of the nonelastic layers has, between the root region and the self-supporting region, a plurality of cutouts which extend along the preferred bending axis and which are spaced apart from one another along the preferred bending axis.

The air-guiding element according to the invention can further have an, in particular nonelastic, thickened portion, which extends in particular parallel to the bending axis, on an outer layer, in particular an upper and/or a lower outer layer, of the self-supporting region, at a distance from the bending axis. The thickened portion can extend parallel to the bending axis, in particular parallel to substantially an entire length of the bending axis. The thickened portion is basically an additional nonelastic layer which, however, is arranged only in a locally limited manner. The thickened portion is advantageously formed at a distance from the bending axis. Furthermore, the thickened portion is advantageously formed on a front end of the self-supporting region.

By virtue of the thickened portion, the self-supporting region is additionally configured to be more torsionally rigid such that, when bending about the bending axis, the self-supporting region is less strongly twisted, that is to say remains more dimensionally stable and thus also better develops its aerodynamic action and function over an entire extent of the air-guiding element.

According to a preferred development, the locally stiffness-reduced region can have one or more interruptions along the bending axis that are formed in the laid fiber scrim, the knitted fiber fabric or the woven fiber fabric. In other words, the laid fiber scrim, the knitted fiber fabric or the woven fiber fabric is severed within a plastic material matrix along the bending axis.

The interruption of the laid fiber scrim, the knitted fiber fabric or the woven fiber fabric is advantageously not visible from outside owing to the plastic material matrix, that is to say that the air-guiding element has an interruption-free, substantially planar surface in the region of the bending axis. However, by virtue of the interruption of the laid fiber scrim, the knitted fiber fabric or the woven fiber fabric, the air-guiding element is more elastic in the region of the bending axis such that bending or pivoting of the air-guiding element about the bending axis is promoted.

By virtue of the interruption or the interruptions of the fibers in the fiber-reinforced plastic, the air-guiding element can be better bent along the bending axis without this hinge, which can also be referred to as a film hinge, being visible from outside.

The invention is additionally directed to a vehicle, in particular to a motor vehicle, having at least one air-guiding element according to the invention.

Here, at least one of the layers of the air-guiding element preferably has a self-supporting region and a root region, at which the air-guiding element is connected to a body or to another structural part of the vehicle, and at least one nonelastic layer, which is situated above the at least one elastic layer with respect to the incident flow of the relative wind, that is to say on the inflow side, has at least one cutout between the root region and the self-supporting region, wherein the at least one cutout defines a preferred bending axis.

It is particularly advantageous if the air-guiding element forms a front spoiler of the vehicle or is provided on a front spoiler.

Here, the air-guiding element is preferably formed by a spoiler lip on a front spoiler of the vehicle.

Preferred exemplary embodiments of the invention with additional design details and further advantages are described and explained in more detail below with reference to the appended drawings.

DETAILED DESCRIPTION OF THE DRAWINGS

Figure 1:
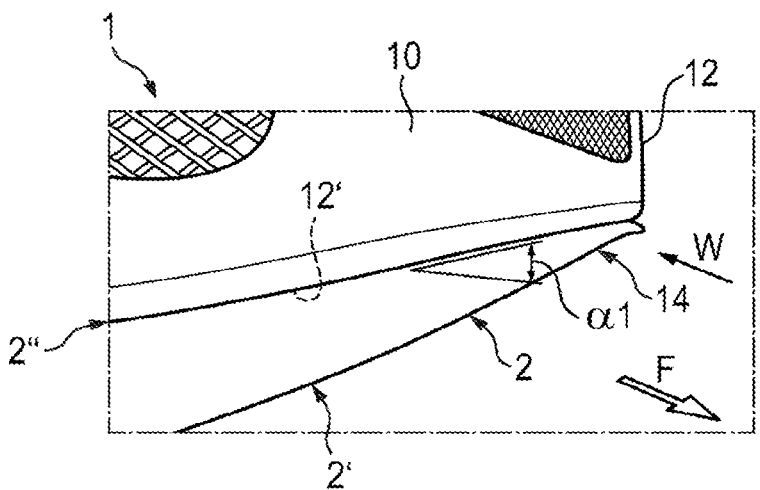
FIG. 1 shows a vehicle front having an air-guiding element according to an embodiment of the invention in a first position.
Figure 2:
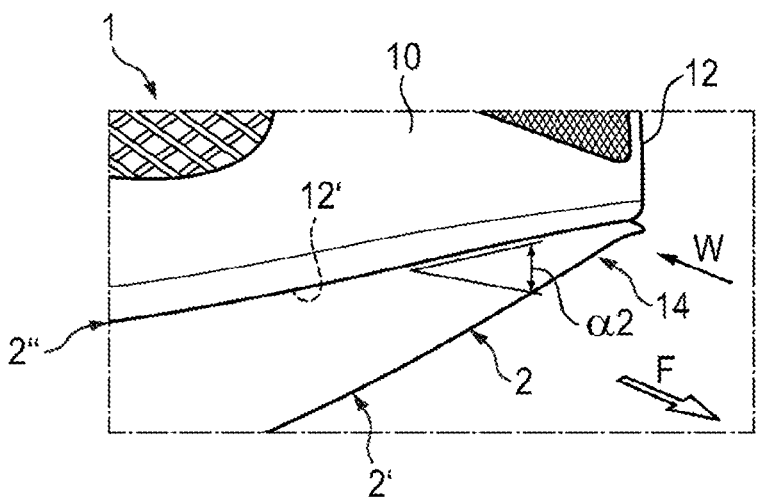
FIG. 2 shows the vehicle front from FIG. 1 with the air-guiding element in a second position.
Figure 3:
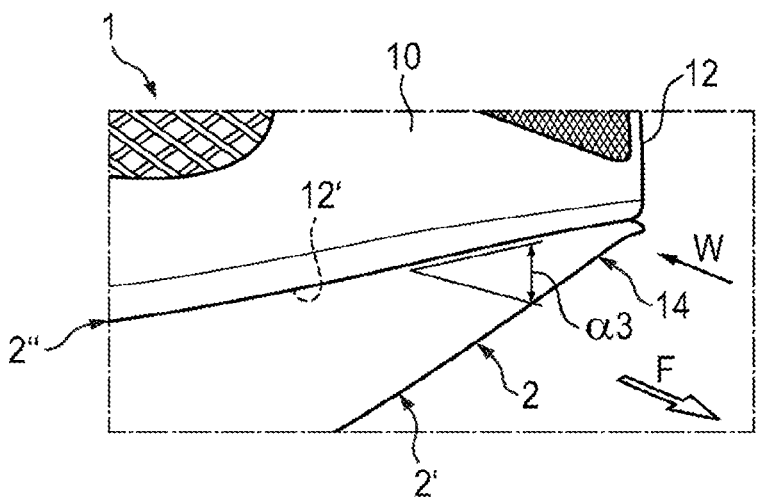
FIG. 3 shows the vehicle front from FIG. 1 with the aid-guiding element in a third position.

FIG. 1 to FIG. 3 each show a front apron 12 of the vehicle body 10 of a vehicle 1, for example of a motor vehicle, having an air-guiding element 2 which forms a front spoiler 14 which, in a manner known per se, is provided in the lower region 12', which extends rearwardly counter to the direction of travel F, of the front apron 12 and is fastened thereto by a root region 2" and which projects obliquely forward and downward in the direction of travel F with a front, self-supporting region 2'.

Although the air-guiding element 2 is rigidly fastened to the front apron 12, it is able to bend slightly between the root region 2" and the self-supporting region 2' such that the relative wind W flowing against the vehicle counter to the direction of travel F presses, with increasing speed of the vehicle 1, more strongly against the self-supporting region 2' of the air-guiding element 2 in the form of a front spoiler 14 and deflects it downward, with the result that the engagement surface of the air-guiding element 2 for the relative wind W becomes greater. As a result, the angle between the front apron 12 and the self-supporting region 2' of the air-guiding element 2 as measured in a vertical longitudinal center plane of the vehicle 1 increases. At lower speed, this angle $\alpha_1$ (FIG. 1) is smaller than the angle $\alpha_2$ at average speed (FIG. 2), and the latter is in turn smaller than the angle $\alpha_3$ at even higher speed (FIG. 3). If the speed is reduced again, the angle $\alpha$ becomes smaller again owing to the material-intrinsic restoring forces of the air-guiding element 2.

Figure 4:
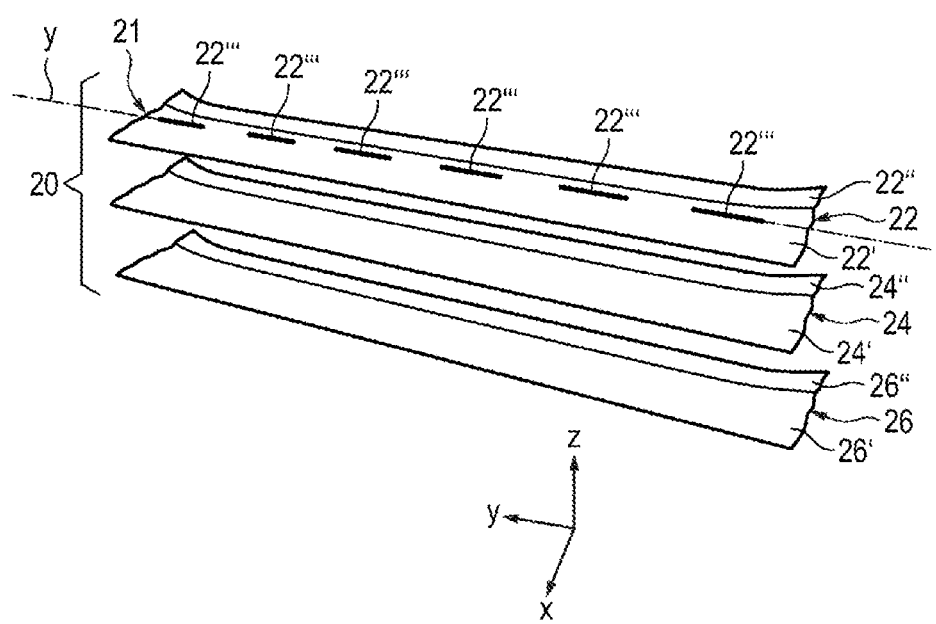
FIG. 4 shows a perspective exploded illustration of the layer structure of an air-guiding element according to FIGS. 1 to 3.

In FIG. 4, the sandwich structure 20 of an air-guiding element 2 is shown in a vertically exploded illustration. An upper nonelastic layer 22 having a self-supporting region 22' and a root region 22" and a lower nonelastic layer 26 having a self-supporting region 26' and a root region 26" each comprise a laid fiber scrim, a knitted fiber fabric or a woven fiber fabric which, in the example shown, are formed from a glass fiber material and/or a carbon fiber material. Between these two nonelastic layers 22, 26, an elastic or partially elastic layer 24 having a self-supporting region 24' and a root region 24" is embedded in the sandwich structure 20 and consists of or comprises an elastic material. For example, the elastic layer 24 is formed by a thin sheet of noncrosslinked rubber, as available, for example, under the tradename Kraibon®.

The layers 22, 24 and 26 are jointly crosslinked with a synthetic resin matrix and thus form the sandwich structure 20 of the air-guiding element 2. Here, the elastic layer 24 consisting of the elastomer is integrated into the sandwich structure 20 of the cured air-guiding element 2 and provides the air-guiding element 2 with elasticity.

The two nonelastic layers 22 and 26 which enclose the elastic layer 24 between them are per se substantially stiff and rigid and are each per se able to bend slightly only on account of their respective small layer thickness. In the described material composite of the sandwich structure 20, the elastic intermediate layer 24 allows a small relative movement between the upper nonelastic layer 22 and the lower nonelastic layer 26, with the result that the overall formation of the sandwich structure 20, that is to say of the air-guiding element 2, is able to be slightly resiliently deflected from its base position of FIG. 1.

To facilitate this deflectability, the upper layer 22, which is situated outwardly during bending by the relative wind W and which is impinged by the relative wind, has a dedicated bending axis y through the provision of oblong holes 22''' whose longitudinal direction extends along or parallel to the bending axis y. The row of the oblong holes 22''' thus defines a locally stiffness-reduced bending region 21 of the upper nonelastic layer 22 and thus of the entire air-guiding element 2.

Figure 5A:
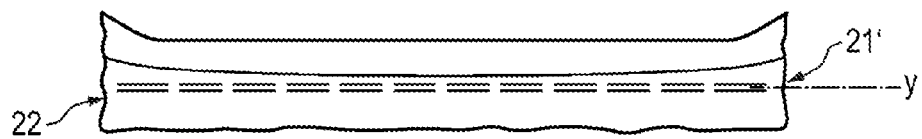
FIGS. 5A to 5C show three variants of nonelastic layers of an air-guiding element according to the invention.

FIG. 5 shows three different embodiments of a locally stiffness-reduced bending region 21 of the upper nonelastic layer 22. In the example of FIG. 5A, the locally stiffness-reduced bending region 21' is formed by a local stiffness adaptation in the sense of a local stiffness reduction by the laminate structure. The thickness of the layer 22 can also be reduced in this region, or the material or the geometry of the fiber orientation can cause a slightly reduced stiffness of the upper nonelastic layer 22 in this region.

Figure 5B:
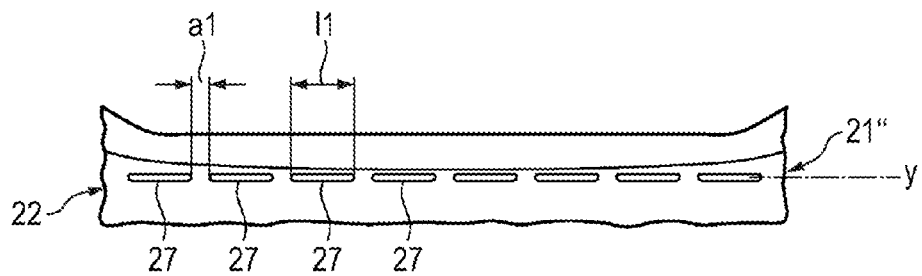

Alternatively, the locally stiffness-reduced bending region 21" according to the example of FIG. 5B can have a row of long cutouts or oblong holes 27 which are spaced only slightly apart from one another. The distance $a_1$ between two adjacent oblong holes 27 is here considerably less than the length $l_1$ of a respective oblong hole 27; it is about 25% to 30% of the length $l_1$.

Figure 5C:
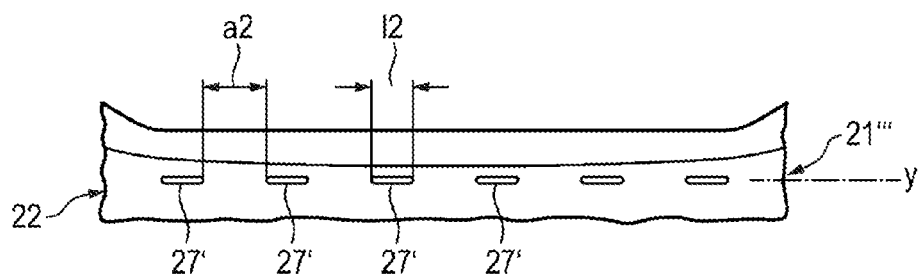

According to the example of FIG. 5C, the one locally stiffness-reduced bending region 21''' is provided by a row of somewhat shorter cutouts or oblong holes 27', which are further spaced apart from one another than in the example of FIG. 5B. The locally stiffness-reduced bending region 21" in FIG. 5B is thus more flexible than the locally stiffness-reduced bending region 21''' in FIG. 5C. The distance $a_2$ between two adjacent oblong holes 27' is here considerably greater than the length $l_2$ of a respective oblong hole 27'; it is about 125% to 150% of the length $l_2$.

FIGS. 6A to 6D each show a vertical section through different respective layer structures 20 each having an outer upper layer 22, an inner upper layer 23 situated thereunder, the elastic layer 24, an inner lower layer 25 situated under the latter, and an outer lower layer 26 thereunder.

Figure 6A:
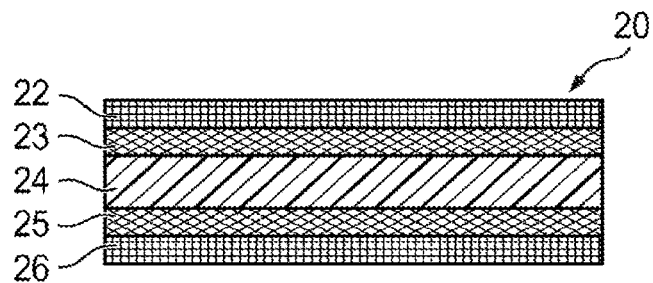
FIGS. 6A to 6D show four variants of the layer structure of an air-guiding element according to the invention.

In the example of FIG. 6A, both the two upper layers 22, 23 and the two lower layers 25, 26 are formed by in each case a 0.25 mm thick woven carbon fiber fabric. The elastic layer 24 consists of a 0.5 mm thick sheet made of noncrosslinked rubber.

Figure 6B:
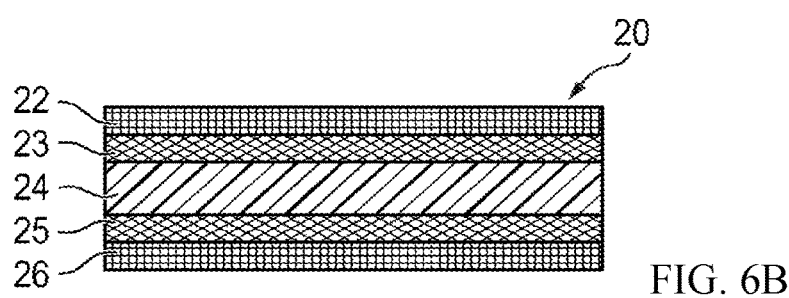

In the example of FIG. 6B, both the two upper layers 22, 23 and the two lower layers 25, 26 are formed by in each case a 0.25 mm thick woven carbon fiber fabric. The elastic layer 24 consists of a 0.5 mm thick sheet of uncrosslinked rubber. Both the inner upper layer 23 and the inner lower layer 25 are provided with a locally stiffness-reduced bending region having oblong holes or cutouts arranged in a row, wherein the total length of the oblong holes or cutouts is approximately 50% of the length of the air-guiding element 2 in the vehicle transverse direction Y.

Figure 6C:
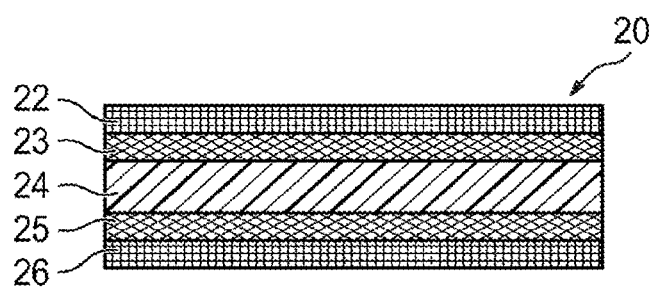

In the example of FIG. 6C, both the two upper layers 22, 23 and the two lower layers 25, 26 are formed by in each case a 0.25 mm thick woven carbon fiber fabric. The elastic layer 24 consists of a 0.5 mm thick sheet of noncrosslinked rubber. Both the inner upper layer 23 and the inner lower layer 25 are provided with a locally stiffness-reduced bending region having oblong holes or cutouts arranged in a row, wherein the total length of the oblong holes or cutouts is approximately 33% of the length of the air-guiding element 2 in the vehicle transverse direction Y.

Instead of the oblong holes, the woven carbon fiber fabric can simply have one or more interruptions—for example, the woven carbon fiber fabric has corresponding cuts along the desired bending axis, that is to say that the fibers are cut along the bending axis. By virtue of the plastic matrix material, the cuts are not visible from outside.

Figure 6D:
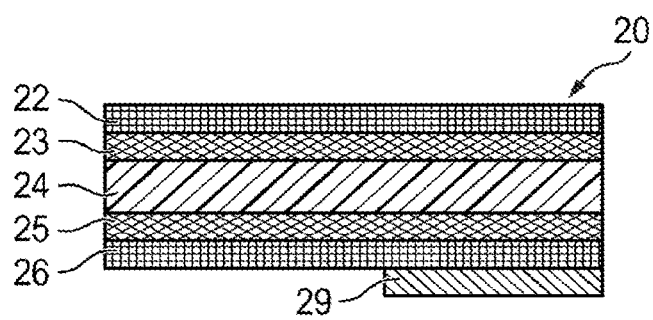

The embodiment of FIG. 6D corresponds in its structure to the embodiment according to FIG. 6B, although a thickened portion 29, which runs in the vehicle transverse direction Y and/or in the vehicle longitudinal direction X and consists of a stiff material, preferably a fiber composite material (for example CRP or GRP), is provided below the outer lower layer 26. The thickened portion 29 improves a torsional stiffness of the self-supporting region of the air-guiding element 2.

The invention is not limited to the above exemplary embodiment, which merely serves for a general explanation of the core idea of the invention. Rather, within the scope of protection, the device according to the invention may also adopt design forms other than those described above. Here, the device may in particular contain features which represent a combination of the respective individual features of the claims.

Reference signs in the claims, the description and the drawings serve merely for a better understanding of the invention and are not intended to limit the scope of protection.

LIST OF REFERENCE SIGNS 1 vehicle
2 air-guiding element
2' self-supporting region
2" root region
10 body
14 front spoiler
20 sandwich structure
21 locally stiffness-reduced bending region
22 upper nonelastic layer
22' self-supporting region
22" root region
22''' cutout
23 nonelastic layer
24 elastic layer
24' self-supporting region
24" self-supporting region
25 nonelastic layer
26 lower nonelastic layer
26' self-supporting region
26" self-supporting region
27 oblong holes
27' oblong holes
29 thickened portion
y bending axis
F direction of travel
W relative wind

The invention claimed is:

1. An air-guiding element on or in a vehicle, comprising:
at least one fiber composite material having a multi-layered sandwich structure, wherein
at least one layer of the multi-layered sandwich structure is an elastic layer which comprises a material comprising an elastomer, and
a plastic matrix material connecting all layers of the multi-layered sandwich structure to one another, wherein
the multi-layered sandwich structure has an upper nonelastic layer and a lower nonelastic layer which each comprise a laid fiber scrim, a knitted fiber fabric or a woven fiber fabric, and the elastic layer is arranged between the at least one upper nonelastic layer and the lower nonelastic layer.

2. The air-guiding element according to claim 1, wherein the multi-layered sandwich structure has the at least one upper nonelastic layer and the at least one lower nonelastic layer, and also at least one further nonelastic layer situated between them, which each comprise a laid fiber scrim, a knitted fiber fabric or a woven fiber fabric, and
in each case, an elastic layer is arranged between the nonelastic layers.

3. The air-guiding element according to claim 1, wherein
at least one of the layers of the air-guiding element has a self-supporting region and a root region at which the air-guiding element is or can be connected to a body or to another structural part of the vehicle, and
at least one nonelastic layer has, between the root region and the self-supporting region, at least one locally stiffness-reduced bending region which defines a preferred bending axis.

4. The air-guiding element according to claim 3, wherein
at least one of the nonelastic layers has, between the root region and the self-supporting region, a plurality of cutouts which extend along the preferred bending axis and are spaced apart from one another in the direction of the preferred bending axis.

5. The air-guiding element according to claim 3, wherein
a nonelastic, thickened portion, which extends in parallel to the bending axis, is provided on the self-supporting region of the upper layer and/or of the lower layer at a distance from the bending axis.

6. The air-guiding element according to claim 3, wherein
the locally stiffness-reduced region of the at least one nonelastic layer has one or more interruptions along the bending axis that are formed in the laid fiber scrim, the knitted fiber fabric or the woven fiber fabric.

7. A vehicle comprising at least one air-guiding element according to claim 1.

8. The vehicle according to claim 7, wherein
the air-guiding element forms a front spoiler of the vehicle or is provided on a front spoiler.

9. An air-guiding element on or in a vehicle, comprising:
at least one fiber composite material having a multi-layered sandwich structure, wherein
at least one layer of the multi-layered sandwich structure is an elastic layer which comprises a material comprising an elastomer,
a plastic matrix material connecting all layers of the multi-layered sandwich structure to one another,
at least one of the layers of the air-guiding element has a self-supporting region and a root region at which the air-guiding element is or can be connected to a body or to another structural part of the vehicle, and
at least one nonelastic layer has, between the root region and the self-supporting region, at least one locally stiffness-reduced bending region which defines a preferred bending axis, wherein
the locally stiffness-reduced bending region has a cutout, wherein the at least one cutout defines the preferred bending axis.

10. The air-guiding element according to claim 9, wherein
the at least one cutout takes the form of an oblong hole or slot whose longitudinal direction extends parallel to the preferred bending axis.

11. The air-guiding element according to claim 10, wherein
at least one of the nonelastic layers has, between the root region and the self-supporting region, a plurality of cutouts which extend along the preferred bending axis and are spaced apart from one another in the direction of the preferred bending axis.

12. The air-guiding element according to claim 9, wherein
at least one of the nonelastic layers has, between the root region and the self-supporting region, a plurality of cutouts which extend along the preferred bending axis and are spaced apart from one another in the direction of the preferred bending axis.

13. A vehicle, comprising:
an air-guiding element on or in the vehicle, comprising:
at least one fiber composite material having a multi-layered sandwich structure, wherein
at least one layer of the multi-layered sandwich structure is an elastic layer which comprises a material comprising an elastomer, and
a plastic matrix material connecting all layers of the multi-layered sandwich structure to one another
a vehicle body, wherein
at least one of the layers of the air-guiding element has a self-supporting region and a root region at which the air-guiding element is connected to the vehicle body or to another structural part of the vehicle, and
at least one nonelastic layer situated above the at least one elastic layer on the inflow side has at least one cutout between the root region and the self-supporting region, wherein the at least one cutout defines a preferred bending axis.

14. The vehicle according to claim 13, wherein
the air-guiding element forms a front spoiler of the vehicle or is provided on a front spoiler.

\* \* \* \* \*